US008190527B2

United States Patent
Stanley

(10) Patent No.: US 8,190,527 B2
(45) Date of Patent: May 29, 2012

(54) CARD-LESS FINANCIAL TRANSACTION

(75) Inventor: Glyn Stanley, Charlotte, NC (US)

(73) Assignee: Wells Fargo Bank, N.A., Charlotte, NC (US)

(*) Notice: Subject to any disclaimer, the term of this patent is extended or adjusted under 35 U.S.C. 154(b) by 0 days.

(21) Appl. No.: 12/950,961

(22) Filed: Nov. 19, 2010

(65) Prior Publication Data

US 2011/0066552 A1 Mar. 17, 2011

Related U.S. Application Data

(63) Continuation of application No. 12/233,162, filed on Sep. 18, 2008, now Pat. No. 7,890,425.

(51) Int. Cl.
*G06Q 400/00* (2006.01)
(52) U.S. Cl. .............................. 705/44; 705/38
(58) Field of Classification Search ............... 705/10–44
See application file for complete search history.

(56) References Cited

U.S. PATENT DOCUMENTS

| | | | | |
|---|---|---|---|---|
| 5,663,546 A * | 9/1997 | Cucinotta et al. | | 235/379 |
| 5,897,625 A * | 4/1999 | Gustin et al. | | 705/43 |
| 6,105,007 A * | 8/2000 | Norris | | 705/38 |
| 6,286,756 B1 * | 9/2001 | Stinson et al. | | 235/379 |
| 7,004,385 B1 * | 2/2006 | Douglass | | 235/379 |
| 7,322,515 B2 * | 1/2008 | Keohane et al. | | 235/379 |
| 7,356,505 B2 * | 4/2008 | March | | 705/39 |
| 7,363,265 B2 * | 4/2008 | Horgan | | 705/35 |
| 7,624,919 B2 * | 12/2009 | Meek et al. | | 235/379 |
| 7,644,039 B1 * | 1/2010 | Magee et al. | | 705/43 |
| 7,654,449 B2 * | 2/2010 | Stoutenburg et al. | | 235/379 |
| 7,668,780 B2 * | 2/2010 | Battaglini et al. | | 705/43 |
| 7,740,171 B2 * | 6/2010 | Kingsborough et al. | | 235/383 |
| 7,783,578 B2 * | 8/2010 | Mann et al. | | 705/64 |
| 7,788,170 B2 * | 8/2010 | Lilly et al. | | 705/38 |
| 2002/0069170 A1 * | 6/2002 | Rizzo et al. | | 705/43 |
| 2003/0126092 A1 * | 7/2003 | Chihara | | 705/67 |
| 2003/0182194 A1 * | 9/2003 | Choey et al. | | 705/16 |
| 2008/0133379 A1 * | 6/2008 | Rowe | | 705/26 |
| 2008/0185429 A1 * | 8/2008 | Saville | | 235/380 |
| 2008/0319896 A1 * | 12/2008 | Carlson et al. | | 705/38 |

* cited by examiner

*Primary Examiner* — Frantzy Poinvil
(74) *Attorney, Agent, or Firm* — Kegler Brown Hill & Ritter; James J. Pingor

(57) ABSTRACT

Systems (and corresponding methodologies) that facilitate card-less financial transactions are provided. The innovation enables card-less ATM (automated teller machine) transactions such as cash withdrawals, transfers, balance inquiries, etc. In aspects, customers can set up an 'electronic wallet' account based upon a pre-set range or otherwise. Accordingly, access to the 'electronic wallet' is granted or denied based upon responses to challenges presented.

20 Claims, 9 Drawing Sheets

# CARD-LESS FINANCIAL TRANSACTION

CROSS-REFERENCE TO RELATED APPLICATIONS

This application is a Continuation of pending U.S. patent application Ser. No. 12/233,162 entitled "CARD-LESS FINANCIAL TRANSACTION" and filed Sep. 18, 2008. The entirety of the above-noted application is incorporated by reference herein.

BACKGROUND

Today, many users conduct their day-to-day cash withdrawals using automated teller machines or ATMs. Financial institutions issue customers ATM cards by which money can be accessed from customer's accounts. Additionally, customers can conduct banking business, such as transfers, deposits, etc. by way of an ATM. In order to use their ATM card to withdraw cash or transact business, customers must enter their personal identification number (PIN) in addition to physically entering their card into the machine.

Most often, a PIN number is a four digit numerical number. This number, or secret pass-code, is often randomly generated by the financial institution that issues the card. Oftentimes, customers are able to modify or personalize this code either by contacting customer service or alternative via a Web or Internet interface. Many users select numbers such as birthdays, telephone numbers, anniversaries, social security numbers or the like as their PIN numbers.

As will be understood, the selection of logical and meaningful numbers can greatly decrease security of the ATM card/PIN combination. In other words, if a physical card ends up in the hands of an unscrupulous or malicious offender, it may be possible for the PIN code to discovered, if logical codes are selected.

As described above, an ATM is a computerized device that provides financial institution customers with access to funds and the ability to trigger transactions in a public space without the need for a human (e.g., bank teller) interaction. With regard to most conventional ATMs, the customer is identified by inserting a bank-issued plastic card (e.g., 'ATM card'). This ATM card is similar to a conventional credit card in that it is usually equipped with a magnetic strip (or chip) that includes a unique card number together with security and identification information. As described above, to eliminate the possibility of unauthorized use, the customer enters a PIN number to validate identity or authorization.

Similar to physical visits to a bank branch, an ATM enables customers to access their bank accounts in order to make cash withdrawals or advances (e.g., credit card cash advances). Unfortunately, the conventional mechanisms that require a plastic card are inconvenient in that they require a user to carry the plastic card in order to be able access funds via an ATM.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems (and corresponding methodologies) that facilitate card-less financial transactions. For example, the innovation enables card-less ATM (automated teller machine) transactions such as cash withdrawals, transfers, balance inquiries, etc. In aspects, customers can set up an 'electronic wallet' account based upon a pre-set range or otherwise. Accordingly, access to the 'electronic wallet' is granted or denied based upon responses to challenges presented. These challenges can represent most any information known by the customer, for example, personal identification number (PIN), social security number, mother's maiden name, etc.

In another aspect of the subject innovation, retrofits of existing ATMs would not require a change in hardware. Rather, a software update or push could be accomplished to enable the ATMs to service card-less transactions. As well, biometrics can be employed to enhance verification/authentication prior to permitting a card-less financial transaction, e.g., cash withdrawal. However, it is to be understood that biometric validation is optional to aspects of the innovation.

In yet other aspects thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
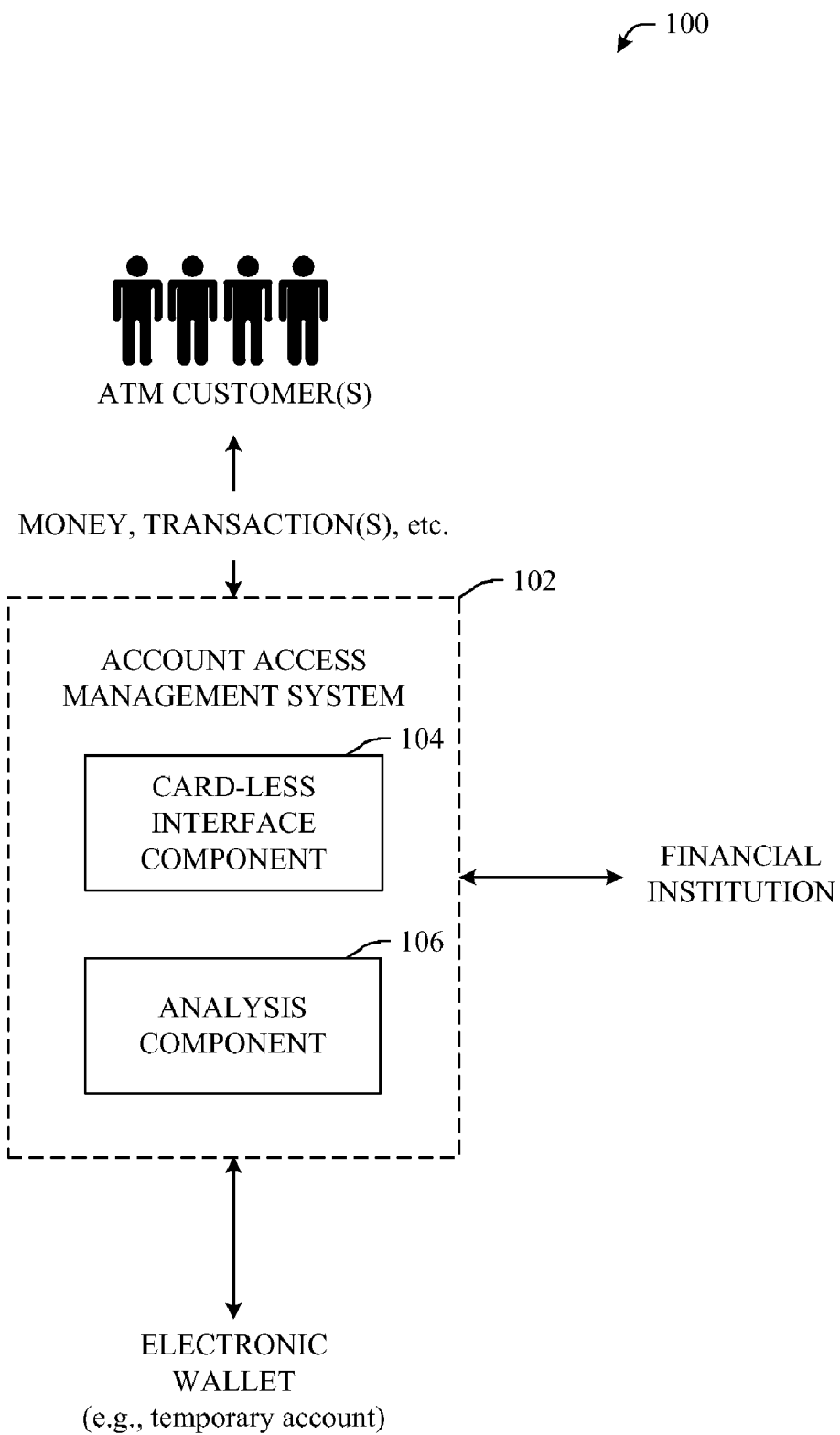
FIG. 1 illustrates an example system that enables card-less automated teller transactions in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an example block diagram of a system 100 that facilitates cardless transactions in accordance with aspects of the innovation. While specific examples are described herein, it is to be understood that these examples are provided to add perspective to the innovation. Accordingly, the features, functions and benefits described herein can be applied to alternative aspects which are to be included within the scope of this disclosure and claims appended hereto.

Generally, the system 100 can include an account access management system 102 that enables card-less interface and security related to account management and related transactions. As illustrated, customers, such as ATM (automated teller machine) customers can interact and gain access to the account access management system 102 merely by inputting information (e.g., without the use of a conventional plastic card). In aspects, the customer can set preferences, policies, balances, etc. by way of a user interface (UI). These preferences, policies and balances can regulate exposure with regard to an account, such as an 'electronic wallet' account.

By way of example, a user can transfer some fixed amount of money into an 'electronic wallet' account (separate from their main savings account). This balance amount can be based upon a transfer, or alternatively, can be based upon a policy or preference (e.g., to maintain a specified balance in the account). Still further, it can be possible for the system 100 to employ machine learning and reasoning (MLR) schemes to infer an appropriate amount to hold within the card-less accessible account based upon an inferred user intention or context. These MLR examples will be better understood upon a review of the discussion infra.

Turning to an example related to the innovation, suppose a user goes out for an exercise jog. Additionally, suppose the user forgets to take (or intentionally leaves) her wallet at home. Here, in the event that the jogger wanted to purchase a bottle of water, it is not possible to withdraw money from a conventional ATM. However, in accordance with the innovation, so long as funds are available or, alternatively, the jogger pre-transfers funds to a specified account prior to leaving to exercise, it can be possible to withdraw cash without a physical plastic card. Here, the jogger can merely enter their account number (or other identification information) followed by a secret pass-code or PIN (personal identification number) to gain access to the funds. As will be understood upon a review of the examples and figures that follow, additional security features (e.g., policy-based and adaptive challenge/response systems) can be employed to enhance security of the card-less systems.

While many examples employ a separate account to enhance security, it is to be understood that the features, functions and benefits of the innovation can be employed in connection with most any account without departing from the spirit and/or scope of the innovation. In other words, in accordance with aspects, an account separated from a customer's primary account(s) can be employed as a 'temporary' or 'electronic wallet' account. As well, if desired, access to primary accounts can also be effected by way of the card-less systems and techniques described herein.

In operation, in aspects, a user can employ a card-less interface component 104 to set security preferences as well as to transfer monies from a primary account into a temporary or card-less accessible account. As described supra, and described in great detail infra, a user can access funds within a temporary account or 'electronic wallet' merely by entering information into a system, for example an ATM. While a temporary account scenario is described herein, it is to be understood that other examples employ access to a primary account without departing from the spirit and/or scope of the innovation and claims appended hereto.

An analysis component 106 can be employed to evaluate credentials and other information thereby granting or denying access to funds. As well, the analysis component 106 can grant or deny access or permission to transact without a physical card, for example, without an ATM card as used by traditional ATMs. As shown in FIG. 1, the account access management component 102, together with sub-components 104, 106, enables a customer to access funds and/or to transact banking actions (e.g., transfers) without a need for a physical card. Rather, the customer can employ only information committed to memory thereby eliminating a need for an ATM or other card-like media. Additionally, because information is transferred from memory, security is enhanced.

Still further, in aspects, customers are able to personalize their security challenge/responses, thus, security can further be enhanced. This, together with the ability to regulate funds, e.g., amounts in a temporary account, it is possible for customers to regulate their exposure. In other words, customers can maintain most any amount in an account which is accessible without a physical card.

Figure 2:
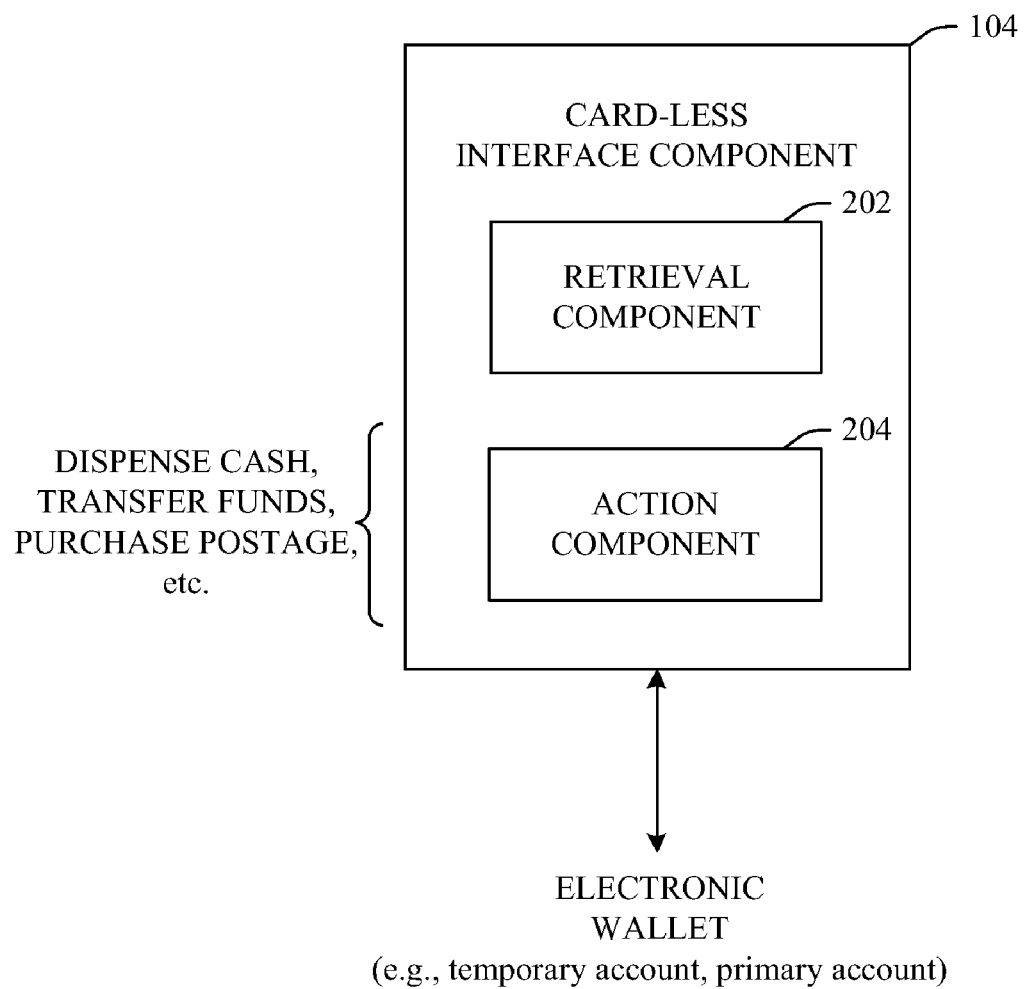
FIG. 2 illustrates an example card-less interface component that facilitates card-less teller transactions in accordance with aspects of the innovation.

Turning now to FIG. 2, a block diagram of a card-less interface component 104 is shown in accordance with an aspect of the innovation. As illustrated, the card-less interface component 104 can include a retrieval component 202 and an action component 204. Together, these sub-components 202, 204 facilitate implementation of an action which can be triggered without a physical card, as used in conventional systems.

In other words, a user can trigger an action merely by entering credentials into a machine or other UI (e.g., card-less interface component 104). Information entered by a customer can be captured by the retrieval component 202 which interacts with the analysis component (106 of FIG. 1). As described above, the analysis component 106 evaluates the credentials thereby permitting or denying an action which can be effected by the action component 204. For instance, the action component 204 can effect actions such as cash withdrawals, for example, from a primary or 'electronic wallet' account. Additionally, the action component 204 can effect, fund transfers, postage purchases, ticket purchases, among other actions.

Figure 3:
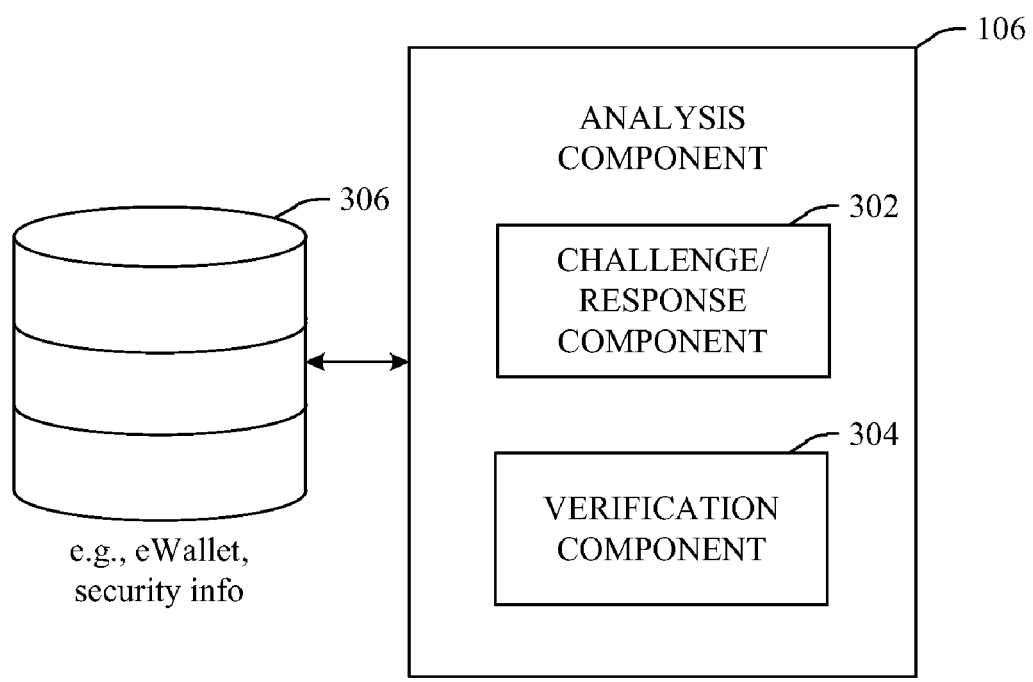
FIG. 3 illustrates an example analysis component in accordance with an aspect of the innovation.

FIG. 3 illustrates an example block diagram of an analysis component 106 in accordance with aspects of the innovation. As described above, the analysis component 106 interacts with the card-less interface component 104 to effect actions without a physical medium (e.g., ATM card). Rather, the analysis component 106 is capable of evaluating credentials in order to permit or deny actions.

In addition to verifying credentials, the analysis component 106 can be employed to select challenge/response parameters which verify identity that regulates access. For instance, the challenge can be as simple as a request for a PIN (personal identification number) to more personal parameters, such as, the customer's mother's maiden name, first pet's name, favorite car, favorite food, etc. It is to be understood that most any criteria or parameter can be employed in a challenge/response scheme. In one simple example, a user can be prompted to enter their account number together with a PIN to gain access to funds or to otherwise transaction financial business.

It is to be understood that other aspects can employ biometric authentication and/or verification. For example, a fingerprint, voice print, facial scan, retina scan or the like can be employed to effect the verification process and therefore permit or deny access. It is to be understood that most of the features, functions and benefits can be implemented merely by updating or pushing updates to conventional systems (e.g., ATMs) thereby retrofitting conventional machines to utilize the card-less aspects and functionality. Additionally, in other aspects, biometrics or the like can be employed in specially equipped machines or retrofitted machines as appropriate.

As shown, the analysis component 106 can include a challenge/response component 302 and a verification component 304. In operation, the challenge/response component 302 can select an appropriate challenge/response based upon a preference, policy or inference. For instance, a user can set the challenge/response questions which will be rendered for identification. By way of example, challenges/responses can range from entry of a PIN, mother's maiden name, favorite food, license plate number, or the like. As well, selection of appropriate questions can be triggered or presented based upon user identity, type of transaction, amount of withdrawal or the like. Essentially, logic can be built-in which manages selection.

The verification component 304 can verify the identity (or authorization) of a user based upon analysis of challenge/response information. As shown, a store 306 can be employed to maintain a set of challenge/responses together with preferences and policies by which they are selected for identity verification. As well, the store 306 can be employed to maintain account information, for example, the amount/balance of funds in a temporary account which is accessible by way of card-less verification.

Figure 4:
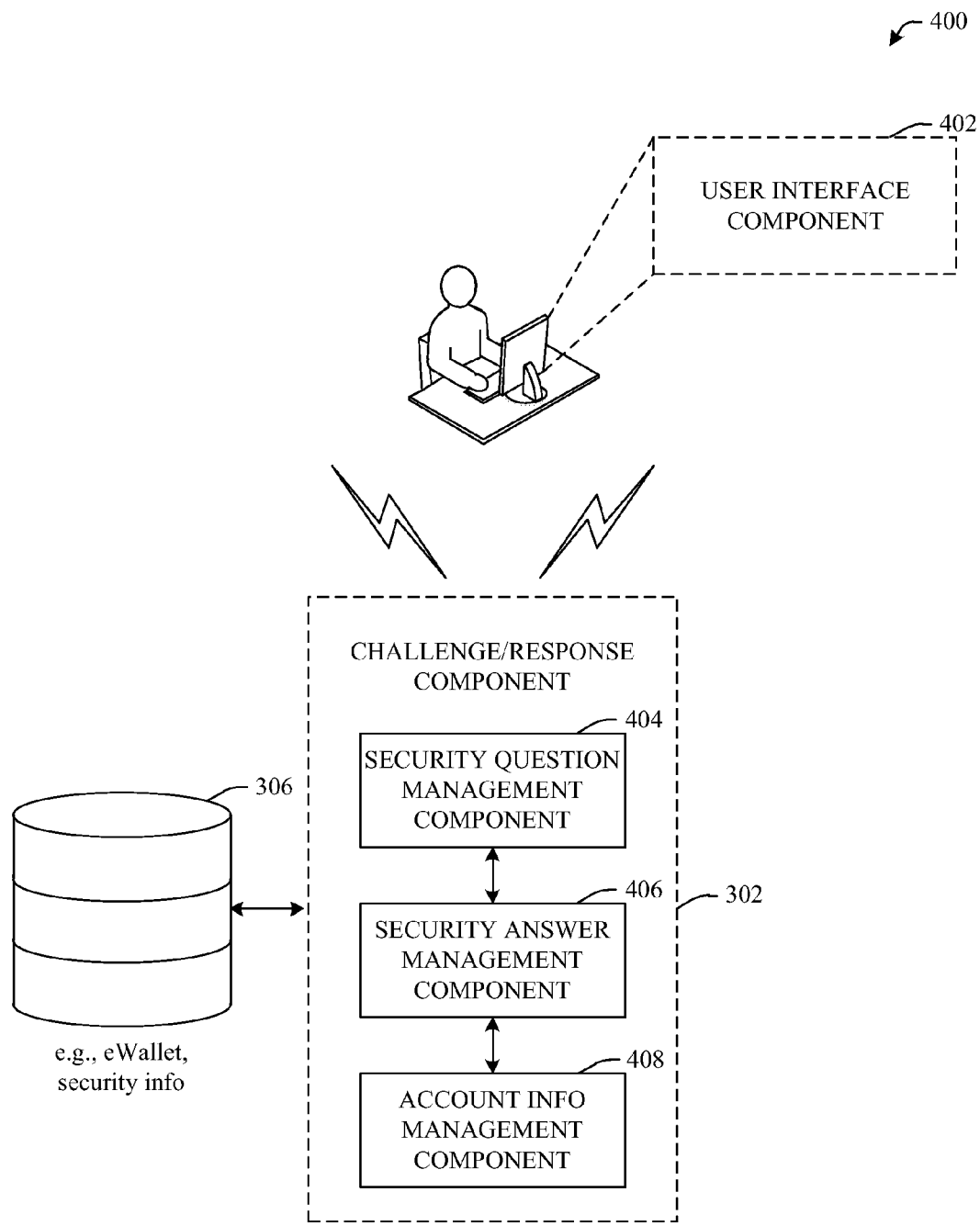
FIG. 4 illustrates an example challenge/response component that enables a user to manage security preferences such as questions presented, funds availability, etc. in accordance with aspects of the innovation.

Turning now to FIG. 4, a block diagram of an example system 400 that facilitates management of challenge/response information in accordance with aspects is shown. Additionally, system 400 can be employed to set aside (or otherwise designate) funds which are accessible by way of card-less transactions. As shown in FIG. 4, a user interface (UI) component 402 can be employed to facilitate interaction between a user and the challenge/response component 302.

In one aspect, the UI component 402 enables a user to designate an amount of funds which can be transferred into an 'electronic wallet' and therefore, accessible by way of card-less transactions. Additionally, most any preference and/or policy can be set by way of the UI component 402. For example, preferences and policies that identify security thresholds (e.g., types of challenges/responses, number of challenges/responses . . . ) can be set by way of the UI component 402.

As illustrated in FIG. 4, the challenge/response management component 302 can include a security question management component 404, a security answer management component 406 and an account information management component 408. Together, these sub-components (404, 406, 408) facilitate identification of, tracking of, indexing of, and retrieval of appropriate security challenge/response information with respect to an identity, type of transaction, amount of transaction, etc. Additionally, the account information management component 408 can be employed to regulate access to funds, the amount of which can be identified by a user via UI component 402.

Figure 5:
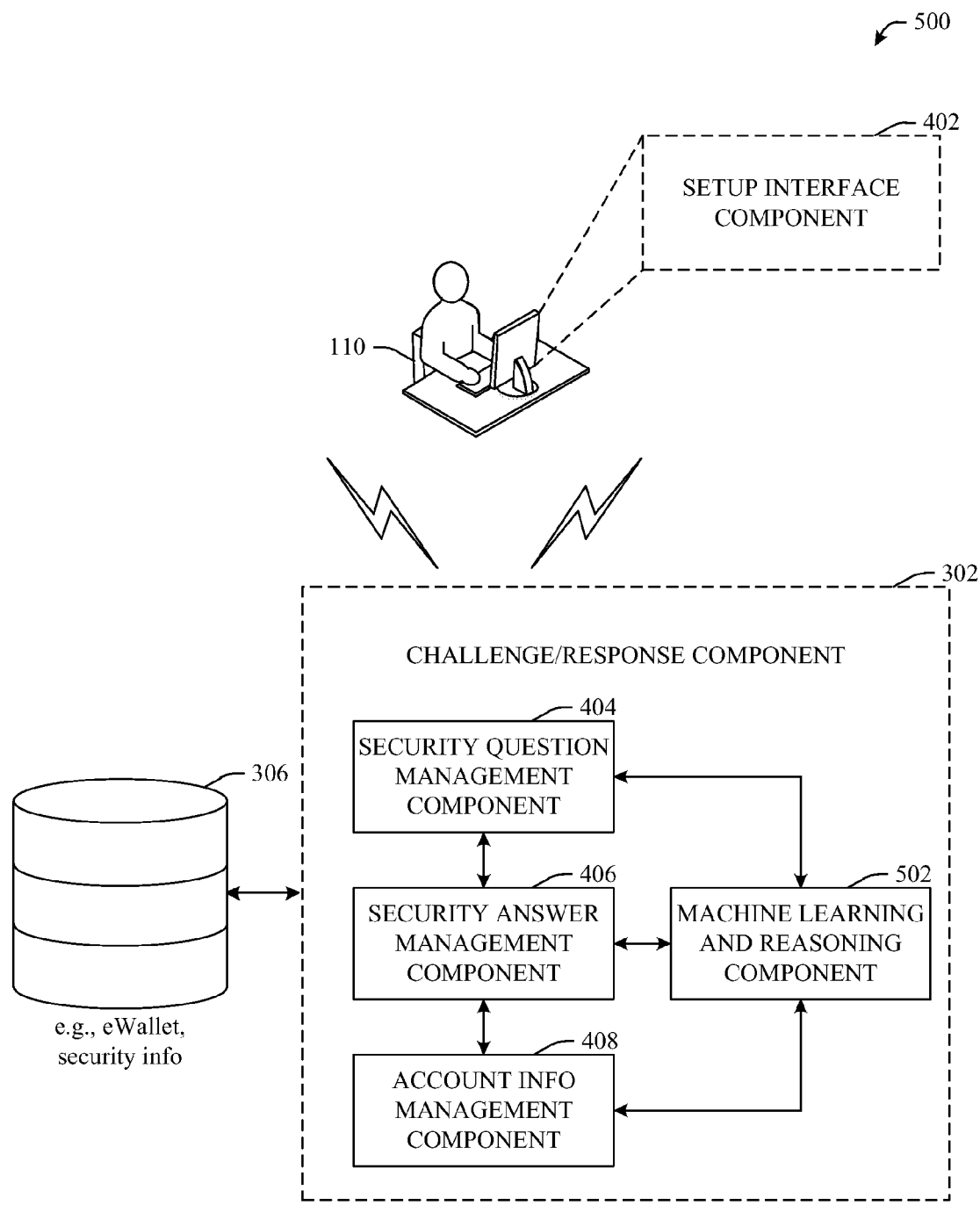
FIG. 5 illustrates an architecture including a machine learning and reasoning component that can automate functionality in accordance with an aspect of the innovation.

FIG. 5 illustrates an example block diagram of an alternative system 500 in accordance with aspects of the innovation. As shown system 500 employs a machine learning and reasoning (MLR) component 502 which facilitates automating one or more features in accordance with the subject innovation. The subject innovation (e.g., in connection with selecting security challenges) can employ various MLR-based schemes for carrying out various aspects thereof. For example, a process for determining which security questions or challenges to present based upon an amount of withdrawal, type of transaction, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which security challenges to present, how many security challenges to present, when/if to replenish funds in an 'electronic wallet,' etc.

Figure 6:
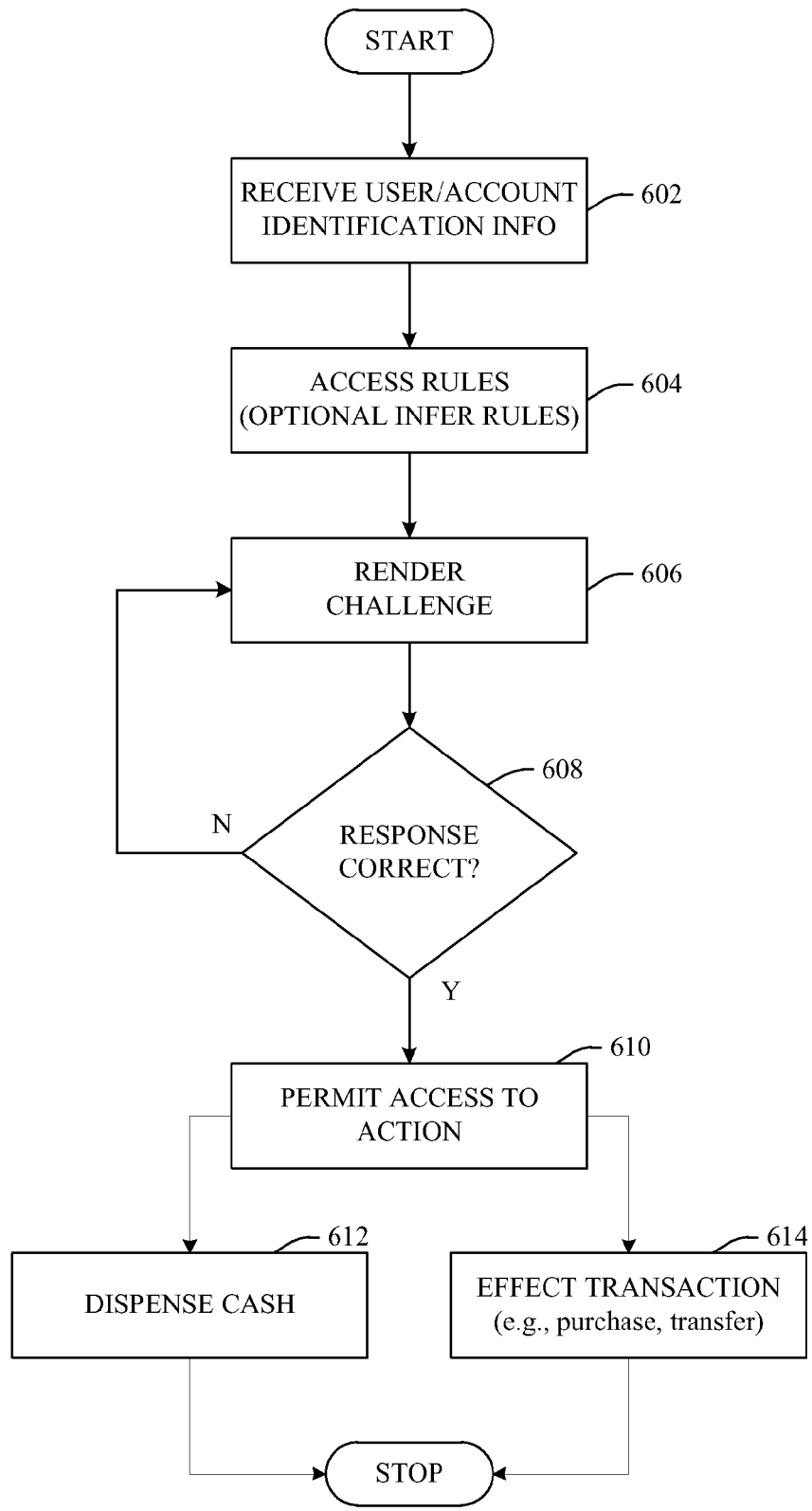
FIG. 6 illustrates an example flow chart of procedures that facilitate card-less transactions in accordance with an aspect of the innovation.

FIG. 6 illustrates a methodology of card-less financial transactions in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 602, user/account identification information can be received. For example, a user can enter information by way of a UI, for example, at an ATM, kiosk, etc. In one example, the information can be a user's numerical account number. Additionally, information related to the type of transaction or amount of withdrawal can be entered. Verification rules can be accessed at 604. Alternatively, verification (e.g., security) rules can be inferred, for example, based upon a type of transaction, amount of withdrawal or other preference or policy. While this example includes input of a proposed transaction prior to verification, it is to be understood that other aspects exist whereby verification is performed prior to verification of identification.

At 606, an appropriate security challenge is presented. As described above, the security challenge can be based upon the transaction type (or characteristics) as well as preferences, policies, etc. While a single challenge is illustrated, it is to be understood that this process can be recursive such that additional challenges can be selected and presented. At 608, a determination is made to establish if the response to a subject challenge is correct. Effectively, the decision at 608 establishes the verification which grants or denies access to account features and/or funds.

As illustrated, if the response is deemed incorrect at 608, the methodology returns to 606 to render another challenge. Although not illustrated, this recursive path can be limited to a specified number of incorrect responses, or alternatively, to a single incorrect response. If the response to the challenge is deemed correct at 608, the methodology progresses to 610 to permit access to the action.

As illustrated, cash can be dispensed at 612 or other transactions (e.g., postage purchase, funds transfer . . . ) can be effected at 614. While specific actions are illustrated in FIG. 6, it is to be understood that other aspects can employ other actions without departing from the spirit and/or scope of the innovation and claims appended hereto.

Figure 7:
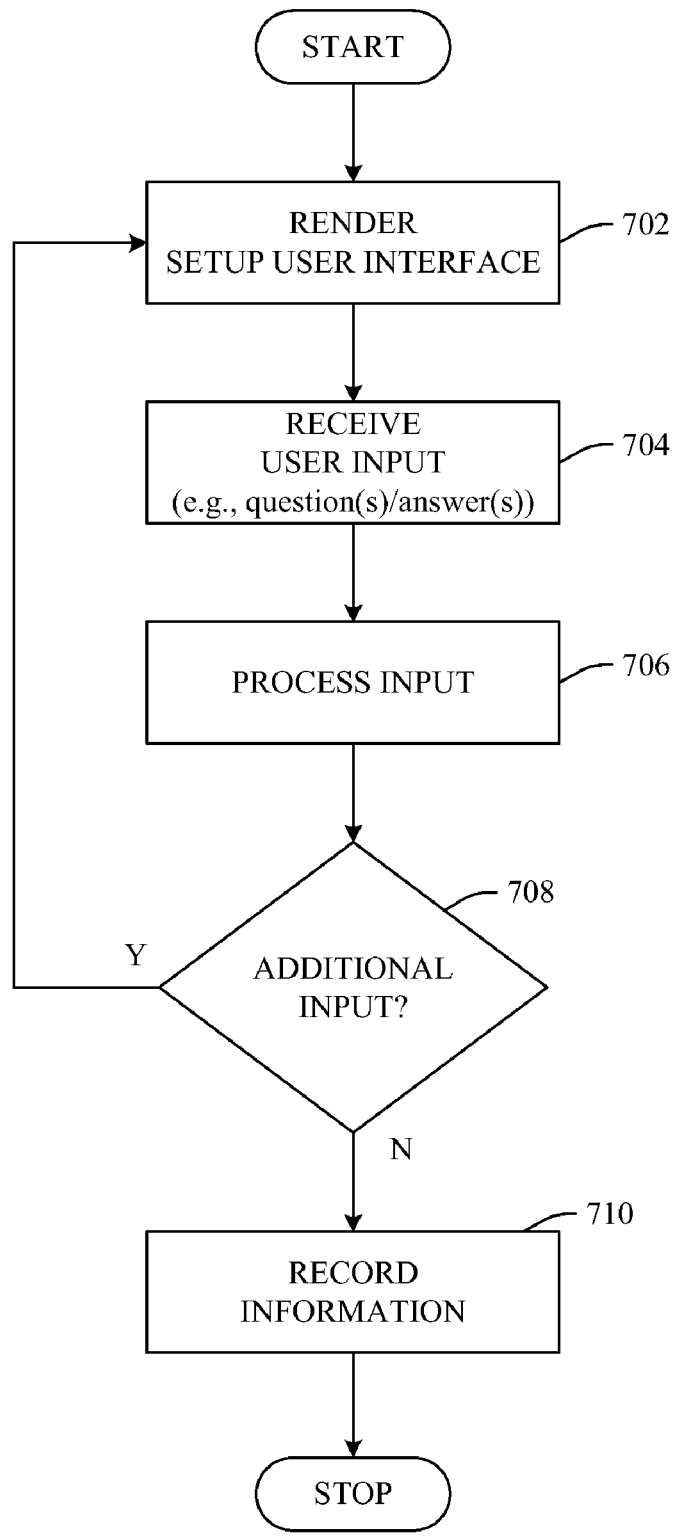
FIG. 7 illustrates an example flow chart of procedures that facilitate setting of security parameters in accordance with an aspect of the innovation.

Turning now to FIG. 7, a process flow of a methodology that facilitates setting user preferences/policies in accordance with aspects is shown. At 702, a UI can be rendered to a user. As described herein, this UI can be rendered by way of an online (e.g., Internet, intranet) site, an ATM, a kiosk, a mobile phone applet, etc. A user can interact with the UI and input(s) can be received at 704. For example, a user can specify challenges and correct responses. Additionally, a user can specify transfer amounts to place into an 'electronic wallet' account which is accessible by way of a card-less transaction.

The input is processed at 706 to establish the type of input, purpose of input, etc. The additional input decision block at 708 demonstrates the recursive characteristics of the process flow. Here, additional inputs can be received by returning the flow to 702. Once all inputs are entered, the information (e.g., challenges, responses, amounts to transfer . . . ) is recorded at 710. For example, the information can be recorded into a store, e.g., store 306 of FIG. 3.

Figure 8:
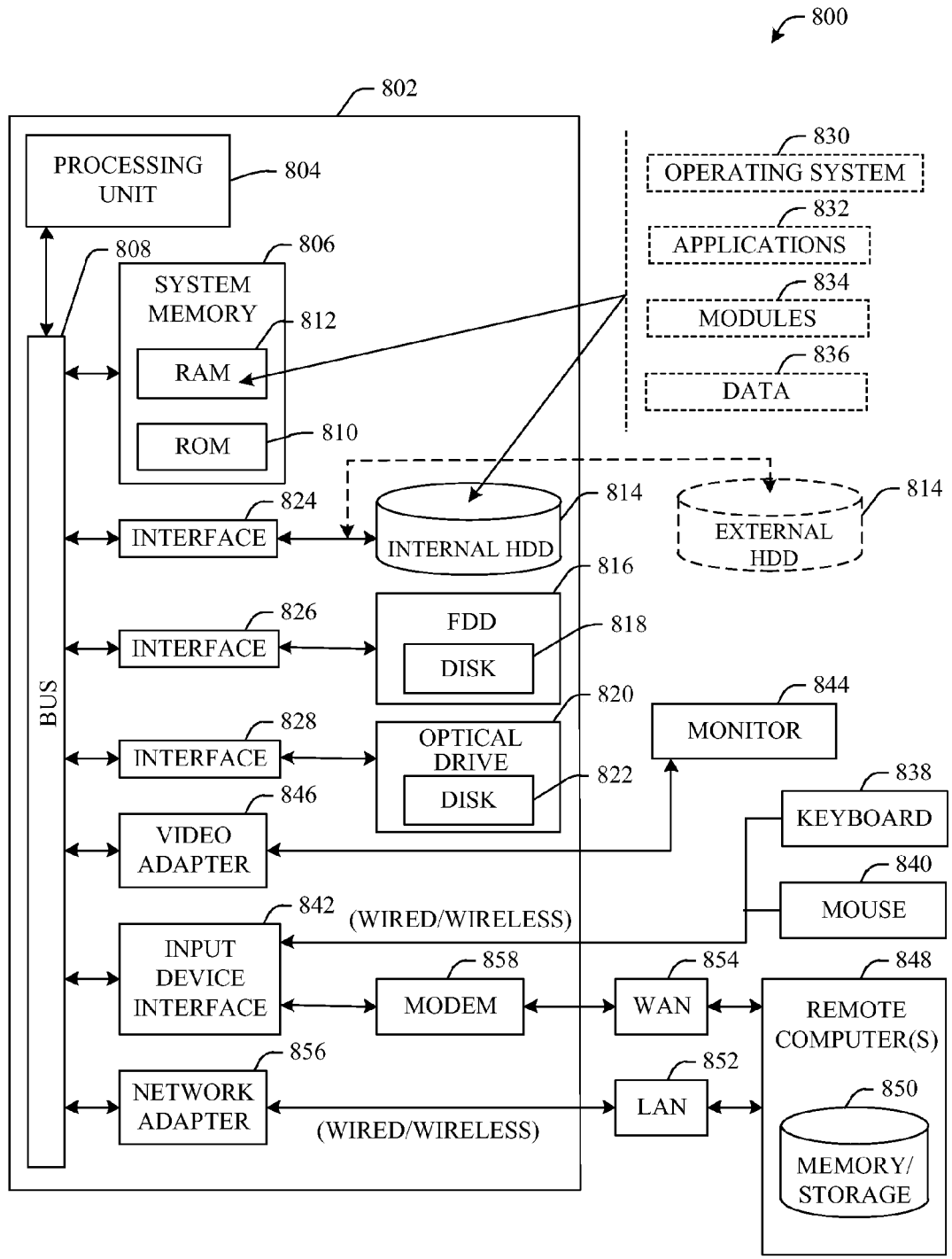
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the subject innovation, FIG. 8 and the following discussion are intended to provide a brief, general description of a suitable computing environment 800 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the innovation includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the innovation can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5

GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
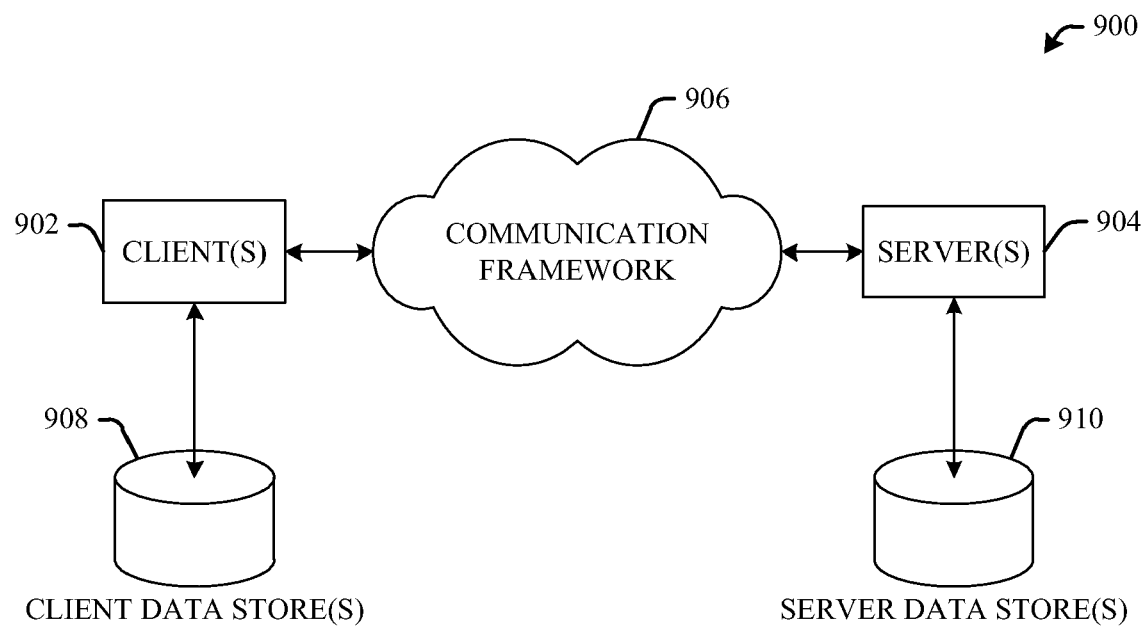
FIG. 9 illustrates a schematic block diagram of an exemplary computing environment in accordance with the subject innovation.

Referring now to FIG. 9, there is illustrated a schematic block diagram of an exemplary computing environment 900 in accordance with the subject innovation. The system 900 includes one or more client(s) 902. The client(s) 902 can be hardware and/or software (e.g., threads, processes, computing devices). The client(s) 902 can house cookie(s) and/or associated contextual information by employing the innovation, for example.

The system 900 also includes one or more server(s) 904. The server(s) 904 can also be hardware and/or software (e.g., threads, processes, computing devices). The servers 904 can house threads to perform transformations by employing the innovation, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates a card-less financial transaction, comprising:
    employing a processor that executes computer executable instructions stored on the memory to implement the following components:
    an interface component that facilitates card-less input of a plurality of account credentials to an automated teller machine (ATM); and
    an analysis component that evaluates a subset of the account credentials and at least one of approves or denies the card-less financial transaction, wherein the financial transaction is associated with a non-virtual account,
    wherein the financial transaction is made with an account separate from a primary account, wherein the account separate from the primary account is associated with the primary account, and wherein funds are maintained in the account separate from the primary account and designated for card-less access.

2. The system of claim 1, wherein the financial transaction is a withdrawal and wherein a balance of the non-virtual account is replenished with an amount based upon the cash withdrawal.

3. The system of claim 1, wherein the financial transaction is at least one of a fund transfer, or balance inquiry.

4. The system of claim 1, further comprising a retrieval component that captures the plurality of account credentials via verbal input from an account owner.

5. The system of claim 1, further comprising an action component that triggers the card-less financial transaction based upon a successful validation of the subset of the plurality of account credentials.

6. The system of claim 5, wherein the transaction is at least one of a withdrawal, fund transfer, balance inquiry.

7. The system of claim 1, further comprising a validation component that facilitates confirmation of a subset of the plurality of account credentials.

8. The system of claim 1, further comprising a challenge/response component that establishes an appropriate challenge based upon at least one of type of the financial action or amount of the financial action.

9. The system of claim 8, further comprising a security question management component that maintains the appropriate challenge based upon the at least one of type of financial action or amount of the financial action.

10. The system of claim 8, further comprising a security answer management component that maintains an answer to the appropriate challenge based upon a user preference.

11. The system of claim 8, further comprising an account information management component that facilitates designation of funds in an 'electronic wallet' account, wherein the 'electronic wallet' account is accessible via the card-less financial transaction.

12. The system of claim 8, further comprising a machine learning and reasoning component that employs at least one of a probabilistic or a statistical-based analysis to infer one or more verification rules based at least in part on one or more of a type or amount of the financial transaction, wherein the challenge/response component establishes the appropriate challenge based at least in part on the one or more verification rules.

13. A computer-implemented method of card-less financial transaction, comprising:
    employing a processor that executes computer readable instructions stored on a computer readable storage medium to implement the following acts:
    evaluating a plurality of card-less account credentials based at least in part upon one of type or amount of the card-less financial transaction;
    at least one of permitting or denying the card-less transaction as a function of a result of the evaluation; and
    receiving information related to the card-less financial transaction, wherein the financial transaction is a cash withdrawal from an 'electronic wallet' account associated with a primary account, wherein the 'electronic wallet' account maintains a designated balance.

14. The computer-implemented method of claim 13, further comprising transferring funds into the 'electronic wallet' account based upon a policy.

15. The computer-implemented method of claim 13, further comprising:
    accessing a rule based upon the card-less financial transaction;
    presenting a security challenge based upon the rule;

receiving a response to the security challenge; and
evaluating the response, wherein the act of permitting or denying is based upon the evaluation.

16. The method of claim 15, wherein the rule is based at least in part on one or more of the type or the amount of the financial transaction, and the rule is inferred based at least in part on at least one of a probabilistic or a statistical-based analysis.

17. The method of claim 13, wherein the card-less credentials are received via an automated teller machine (ATM).

18. A computer-executable system, comprising:
   employing a processor that executes computer executable instructions stored on a computer readable storage medium to implement the following means:
   means for receiving card-less credentials;
   means for evaluating a subset of the card-less credentials; and
   means for granting or denying access to funds in an 'electronic wallet' account via an automated teller machine (ATM) based at least in part upon the evaluation, wherein the 'electronic wallet' account is separate from and associated with a primary account.

19. The computer-executable system of claim 18, further comprising means for replenishing funds into the 'electronic wallet' account based upon an amount of the financial transaction.

20. The computer-executable system of claim 18, further comprising:
   means for accepting and analyzing verbal instructions; and
   means for converting the verbal instructions into the plurality of card-less credentials.

* * * * *